July 20, 1937.     S. M. ANDERSON     2,087,790
COOLING AND CONDITIONING SYSTEM FOR PASSENGER VEHICLES
Filed Feb. 16, 1932     5 Sheets-Sheet 1
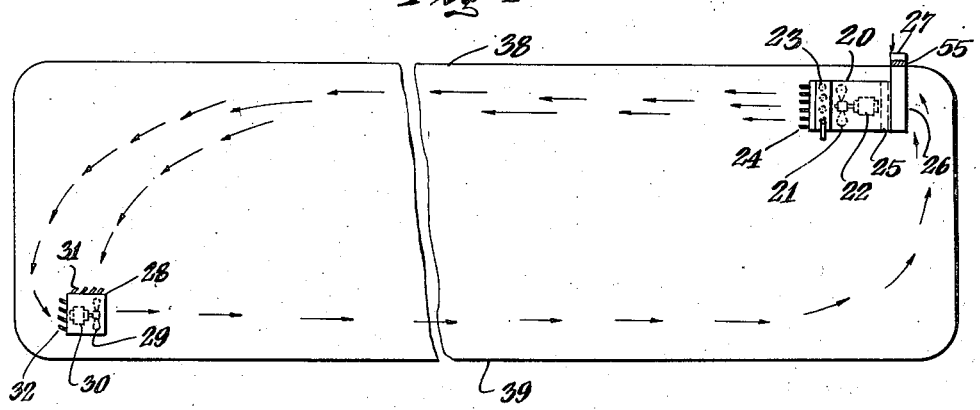
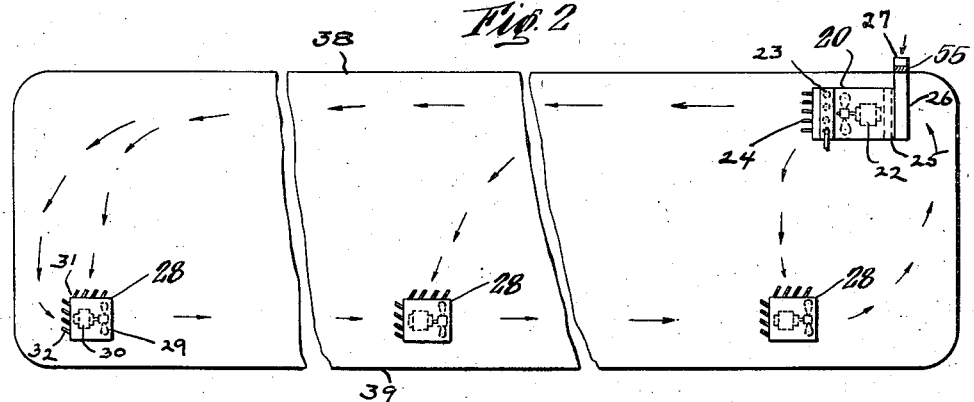
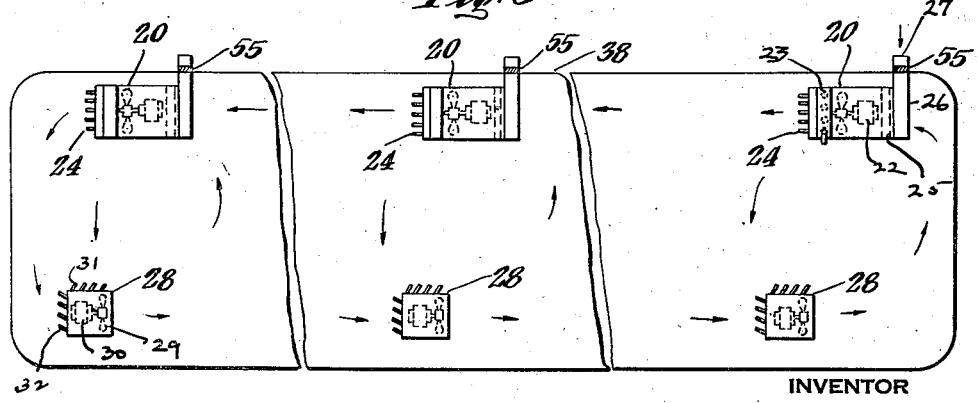
INVENTOR
Samuel M. Anderson
BY
Duell, Dunn & Anderson
ATTORNEY July 20, 1937. S. M. ANDERSON 2,087,790
COOLING AND CONDITIONING SYSTEM FOR PASSENGER VEHICLES
Filed Feb. 16, 1932 5 Sheets-Sheet 2
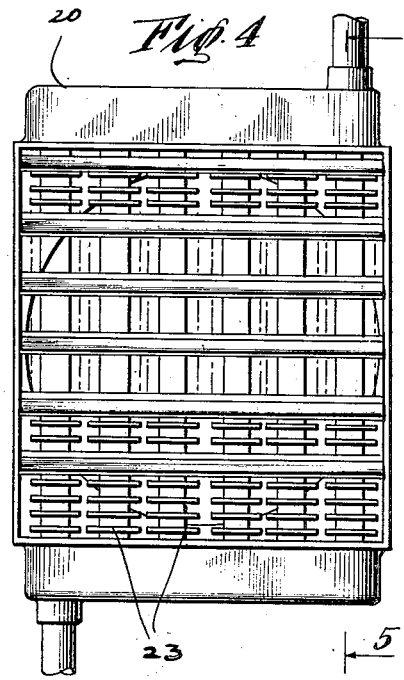
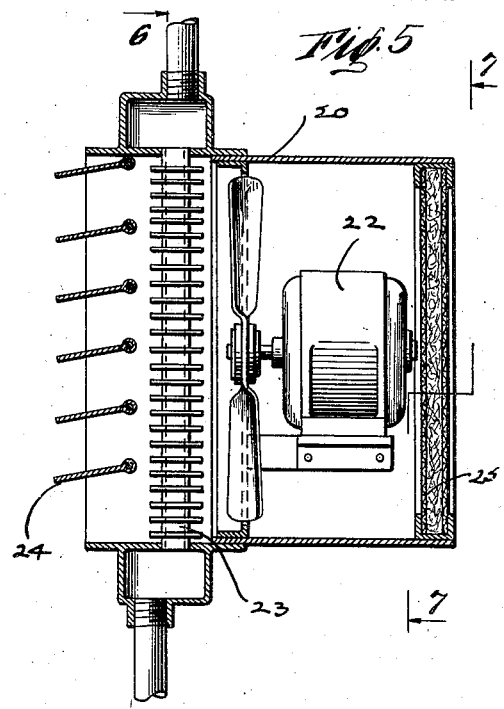
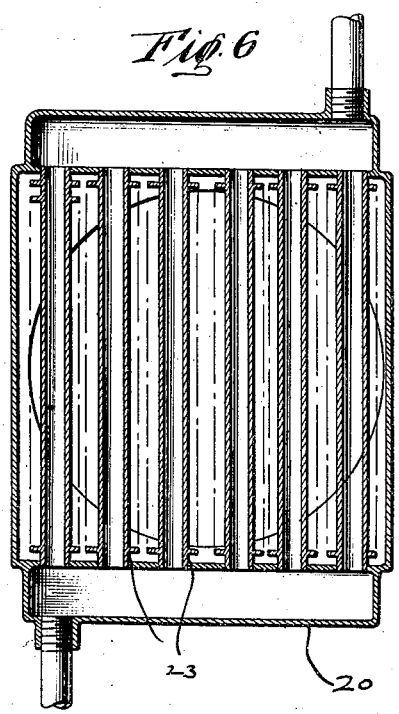
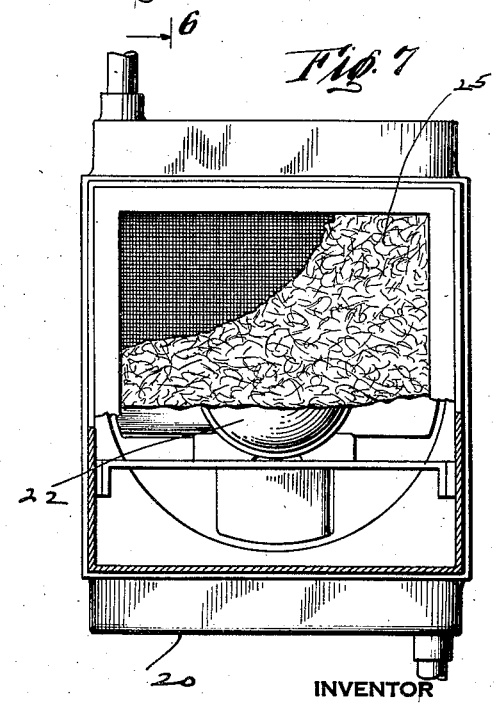
INVENTOR
Samuel M. Anderson
BY
Duell, Dunn & Anderson
ATTORNEY

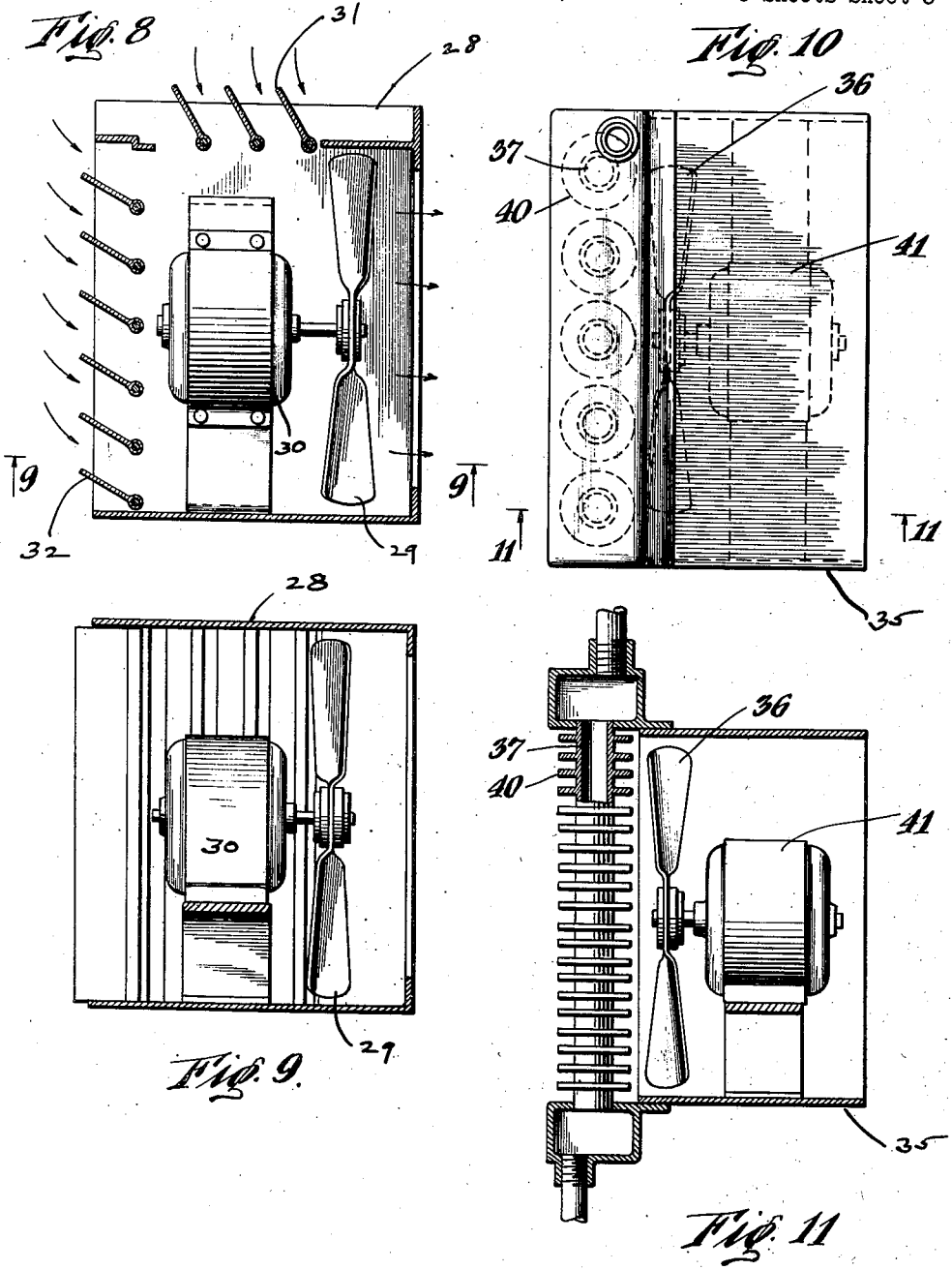

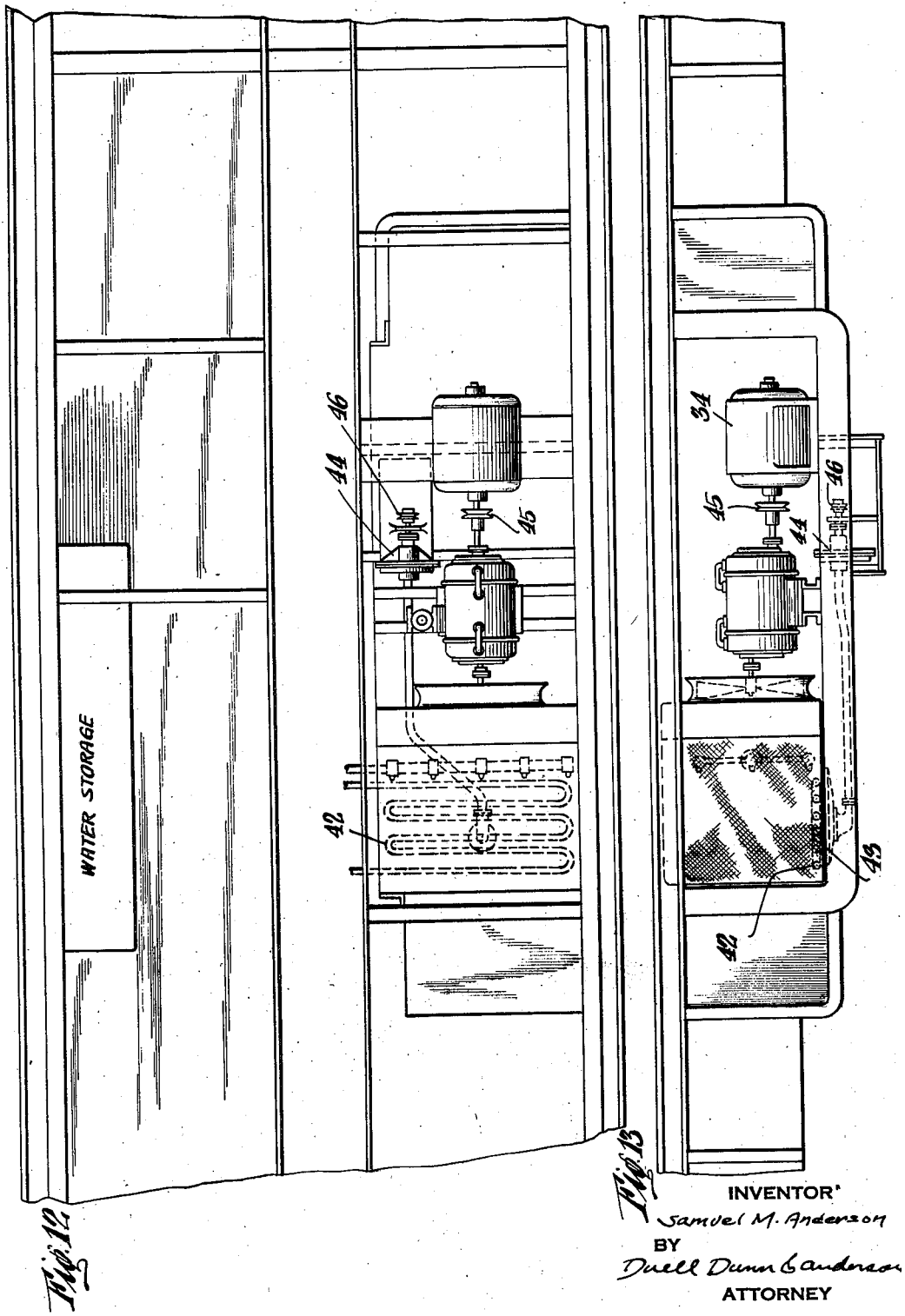

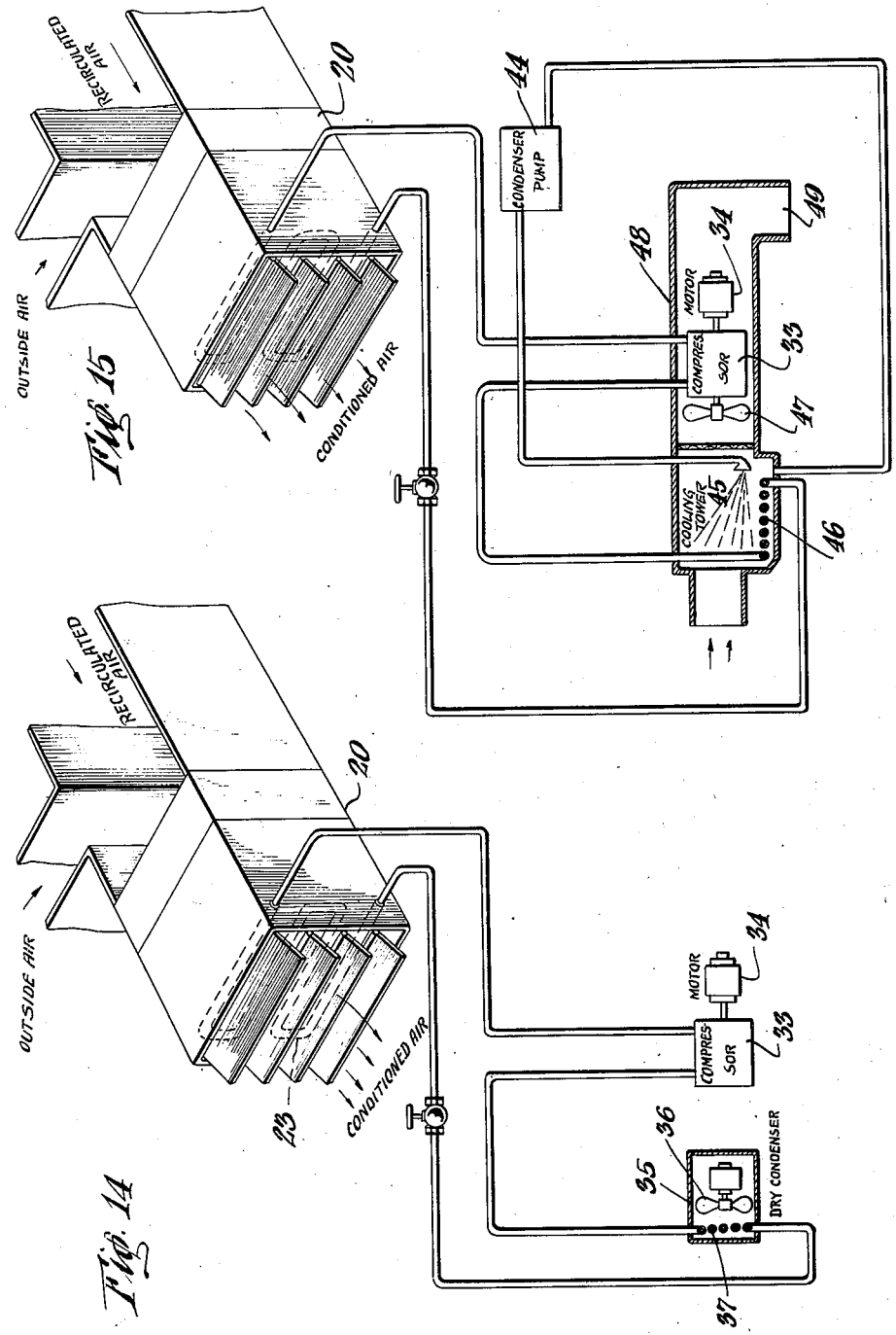

Patented July 20, 1937

2,087,790

UNITED STATES PATENT OFFICE 2,087,790

COOLING AND CONDITIONING SYSTEM FOR PASSENGER VEHICLES

Samuel M. Anderson, Sharon, Mass., assignor to B. F. Sturtevant Company, Boston, Mass., a corporation of Massachusetts Application February 16, 1932, Serial No. 593,242

6 Claims. (Cl. 98—4)

This invention relates to the conditioning of air for passenger vehicles and relates more particularly to the conditioning of air circulated through railway cars.

It is now becoming well known that human comfort requires that the air within an enclosure should be not only circulated to provide sufficient ventilation, but should in winter be warmed with moisture added to maintain the proper relative humidity and in summer should be cooled and moisture extracted from it to overcome the excessive humidity which is usually present.

While the conditioning of air for motion picture theaters, hotel, office and industrial buildings has been developed to a high degree in recent years, the air conditioning for vehicles, and particularly railway cars, has been more or less neglected, due, perhaps, to the peculiar problems involved and the many difficulties present. Among the difficulties which present themselves are the lack of space in a railway car which already of necessity has had to accommodate the maximum of equipment in the minimum of space, the excessive refrigeration equipment which would have to be carried if the ordinary method of conditioning buildings were followed, the changing temperature conditions through which a railway car must pass, the cost of the equipment, and other difficulties.

An object of this invention is to condition the air supplied to passenger vehicles with a minimum of apparatus and expense.

Another object of the invention is to condition the air supplied to passenger vehicles without the necessity of modification of the interior of the vehicles.

Another object of the invention is to condition the air supplied to passenger vehicles without using ventilating ducts.

In one embodiment of this invention a refrigerant compressor, driven by a conventional motor, is mounted on the under side of a railway car and compresses the refrigerant which is cooled in a condenser and allowed to expand in expansion coils, which are mounted in a cooling chamber in the exterior of the car in such a manner, that the air to be conditioned passes over the expansion coils and is cooled by the expansion of the refrigerant.

According to a feature of the invention, the cooling chamber is a small unit which is mounted in the railway car at one end and in the space below the ceiling of the car and above the space occupied by the passengers. Air from inside the car and outside air is drawn into the chamber, mixed by a fan or blower, driven over the cooling coils, and delivered at high velocity into and down along one side of the car. Located at the other end and at the opposite side of the car is a fan unit provided with directional louvres which draw in the air projected from the cooling chamber and send it back along the other side of the car to the recirculated air intake of the cooling chamber. The cooling chamber projects the cooled air along one side of the car without the necessity of ventilating ducts. The cooled air is projected at high velocity above the space occupied by the passengers. Some of the cooled air descends by gravity into the space occupied by the passengers and cools that space. The fan unit located at the other end of the car takes the cooled air which, at the time it reaches the fan unit, is warmed considerably and returns it along the other side of the car. It is seen that with this arrangement no ventilating ducts along the sides of the car are required and that the application of an air conditioning system to a railway car is expedited and simplified. According to this invention, no longitudinal ducts are required, the space occupied by the units is small, and the units can be installed without modification of the interior of the car.

In another embodiment of the invention, a plurality of small cooling units are spaced along one side of the car and along the other side of the car a plurality of fan units are mounted.

Other embodiments of the invention provide combinations of cooling chambers and fan units arranged in different positions to project cooled air and to circulate it throughout the car. The number and arrangement of the cooling units and fan units depends upon the type of car being conditioned, the climate, the season of the year, etc.

The invention will now be described with reference to the drawings, of which:

Fig. 1 is a diagrammatic plan view of one embodiment of the invention utilizing a single cooling unit and a single fan unit;

Fig. 2 is a diagrammatic plan view of another embodiment of the invention utilizing a single cooling unit and several fan units;

Fig. 3 is a diagrammatic plan view of another embodiment of the invention utilizing a plurality of cooling units and a plurality of fan units;

Fig. 4 is a front view of one of the cooling units of Figs. 1 to 3 inclusive;

Fig. 5 is a side sectional view along the lines 5—5 of Fig. 4;

Fig. 6 is a front sectional view along the lines 6—6 of Fig. 5;

Fig. 7 is a rear view, with a portion removed, of Fig. 5;

Fig. 8 is a side sectional view of one of the fan units utilized in Figs. 1 to 3 inclusive;

Fig. 9 is a sectional view along the lines 9—9 of Fig. 8;

Fig. 10 is a side view, with the interior in dotted line, of one embodiment of a condenser unit utilized to cool the compressed refrigerant;

Fig. 11 is a sectional view along the line 11—11 of Fig. 10;

Fig. 12 is a plan view, with the floor removed, of an installation of refrigeration equipment on the under side of the car;

Fig. 13 is a side view of the apparatus shown by Fig. 12;

Fig. 14 is a diagrammatic view of one embodiment of a complete refrigeration and air conditioning system, according to this invention, utilizing a dry condenser for cooling the heated refrigerant, and Fig. 15 is a diagrammatic view of a complete refrigeration and air conditioning system, according to this invention, utilizing a cooling tower for cooling the heated refrigerant.

The cooling units 20 illustrated diagrammatically by Figs. 1 to 3 inclusive and Figs. 14 and 15, and structurally by Figs. 4 to 7 inclusive, comprise a fan 21, driven by motor 22, cooling coils 23, directional louvres 24, and filter 25. Associated with the unit 20 is the recirculated air inlet 26 and the outside air inlet 27. The filters 25 as a part of these units are optional, since filters 55 may be mounted in the outside air intakes to filter the outside air indrawn.

The fan units 28 illustrated diagrammatically by Figs. 1 to 3 inclusive and structurally by Figs. 8 and 9, comprise the fan 29, driven by motor 30, and two sets of directional louvres 31 and 32.

Referring to Fig. 14, the operation of the refrigeration system in its association with a cooling unit 20 will be explained. The compressor 33, driven by the motor 34, compresses any suitable refrigerant, such as methyl chloride. The compressed and heated refrigerant passes through the dry condenser 35 where it is cooled by the action of the current of air created by the fan 36 and passing over the condenser coils 37. The partially cooled refrigerant then passes into the expansion coils 23 which are mounted in the cooling unit 20 and therein expand, extracting heat from the coils 23. The air passing through the cooling unit 20 and into the interior of the car, passes over the coils 23 and is cooled by contact therewith. The embodiment of the system illustrated diagrammatically by Fig. 15 will be explained later on in the specification.

Referring now to Fig. 1, it was explained in the last paragraph how the refrigerant expanding in the coils 23 cooled these coils and the air which passes in contact with them. In the operation of the cooling unit 20, the fan 21 draws recirculated air from the car into the inlet 26 and fresh air through inlet 27, passes the mixed air over the cooling coils 23 where the air is cooled, and if its relative humidity is high, has its moisture content reduced by the lower dew point. The physical arrangement of the unit 20 and its associated apparatus is such that a small amount of air is highly conditioned and projected at high velocity down along the side 38 of the car in the direction indicated by the arrows. Mounted at the other end of the car and diagonally opposite to the cooling unit 20 is the fan unit 29 which takes the air delivered by the cooling unit 20 and returns it along the other side 39 of the car to the intake side of the cooling unit. The adjustable louvres 24 on the cooling unit 20 and the adjustable louvre units 31 and 32 of the fan unit 29 may be adjusted to direct the flow of air, as may be desired. As has previously been explained, the cold air is projected above the space occupied by the passengers and does not create drafts since the diffusion of the heavier cooled air into the space occupied by the passengers is so gradual that the temperature differences at any one interval are small. With this arrangement, the cooling unit projects the cooled air, its circulation is assisted by the fan unit, and the combined action of these two units is to eliminate the necessity of expensive and complicated duct work which it has been the practice to construct along the side or in the upper half deck of the car.

Referring now to Fig. 2, the single cooling unit 20, located at one end of the car, projects cooled air, the circulation of which is assisted by the three fan units 28. The arrows indicate the direction of air flow.

In the embodiment illustrated by Fig. 3, the three cooling units 20 are spaced along one side 38 of the car, above the space occupied by the passengers and below the ceiling, and opposite the cooling units 20, are arranged the fan units 28 which assist in the circulation of the air and return the warmed air to the intake side of the cooling units.

The embodiments of the invention illustrated by Figs. 2 and 3, while more complicated than that shown by Fig. 1, utilize the same principle of invention and may be desirable for certain types of railway cars, or may be found suitable where a railway car has to travel through extremely warm and humid regions. All three embodiments, however, and other embodiments where the units may be spaced and arranged in various combinations, utilize the simple units according to this invention, which units may be easily installed at small expense to accomplish comfort for railway car passengers regardless of outside weather conditions.

The circulation of the conditioned air, as described above, has been on the assumption that the air flow is horizontal and parallel to the floor and ceiling of the car. Obviously, however, if desirable, the conditioning units may be arranged to project conditioned air downwardly in the space occupied by the passengers. For example, referring particularly to Fig. 3, the air conditioning units 20 may have their directional louvres 24 arranged to discharge the air directly into the space occupied by the passengers, their respective, oppositely placed fan units serving to return the air thus projected. To accomplish this, the louvres 24 may be adjusted to direct the air downwardly, or the units 20 may be mounted lower in the car so that their output is directed directly into the space occupied by the passengers.

Two ways of filtering the air to be conditioned are contemplated. The filter 25, as has already been described, may be made a part of the air conditioning unit 20, or alternately, the filtering may be accomplished by the filters 55 placed in the outside air inlet 27. With the latter arrangement, the air circulated inside the car is under a slight pressure which effectively prevents smoke, dust, and cinders from coming through cracks around the windows, for example.

The dry condenser shown diagrammatically by Fig. 14 and illustrated structurally by Figs. 10 and 11, is seen to comprise the coils of pipe 37 through which the heated refrigerant flows. The pipes 37 are provided with extended surfaces 40 and the fan 36, driven by the motor 41, passes a stream of air at high velocity over the surfaces 40 to cool the pipes 37 and the contained refrigerant.

Referring now to Fig. 15, there is shown another embodiment of a refrigeration system which may be utilized with the cooling unit 20. The compressor 33 in this embodiment passes the compressed and heated refrigerant through the condenser coils 46 which are mounted in the cooling tower 45. Cooling water is circulated from a suitable source by the condenser pump 44 and is projected through the spray nozzles in the cooling tower 45 onto the condenser coils 46. Outside air is drawn into the cooling tower 45 by means of the fan 47, associated with the compressor 33, and this air passing through the spray from the spray nozzles in the cooling tower 45 cools the spray water by evaporation. The cooled spray water falls on the coils 46 and cools them and the contained refrigerant. Air from the cooling tower 45 passes through the enclosure 48 and over the compressor 33 and driving motor 34 and is discharged to the tracks through the discharge outlet 49. The cooled air lowers the temperature of the compressor and motor, thus enabling smaller units to be operated at higher capacities.

Figs. 12 and 13 show the refrigeration apparatus of Fig. 15, mounted conveniently and compactly on the under side of the car. The condenser pump 44 is driven from the motor 34 by means of a belt running over the pulleys 45 and 46. The refrigeration equipment is seen to be mounted as a unit on the under side of the car, requiring little or no modification of the car structure.

The cooling units and fan units, which are mounted between the space occupied by the passengers and the ceiling of the car, as has previously been explained, require little or no modification of the internal structure of the car. The design and physical proportions of the entire system are such that the separate units may be quickly and inexpensively installed on any existing railway car.

While the air conditioning units have been described as cooling units for summer operation, it is believed to be obvious that they could be converted to heater units for winter use, and that winter operation is within the contemplation of this invention.

While the conditioning and fan units have been illustrated as being placed in open view in the car, they may, for the sake of appearance, be placed behind false walls with short ducts connecting them to decorative grilles.

While the air conditioning units 20 have been described as surface coolers supplied with refrigerant which is expanded in the units, the invention is not to be limited to this form of construction. A spray chamber may be made a part of the conditioning unit and chilled water, which may be chilled by refrigeration or by a source of negative stored heat, such as ice, may be supplied to the spray chamber for cooling the air passing therethrough.

While the various embodiments of the invention have been described in connection with the conditioning of air for railway cars, it is believed to be obvious that any passenger vehicle can be conditioned according to this invention.

While one or more embodiments of the invention have been described for the purpose of illustration, it should be realized that many modifications may be made by those skilled in the art without departing from the spirit of the invention.

What is claimed is:

1. The method of supplying air at a desired temperature into the passenger space of a railway passenger car, which comprises conditioning the air, projecting the air in an unconfined substantially horizontal blast down along and parallel to one longitudinal side of said car substantially above the passenger space, and deflecting air from said blast, and directing it substantially horizontally crosswise said car at a plurality of longitudinally spaced points.

2. The method of supplying air at a desired temperature into the passenger space of a railway passenger car, which comprises conditioning the air, projecting the air in a plurality of unconfined substantially horizontal blasts from one longitudinal side of said car to the other longitudinal side thereof substantially above the passenger space, and passing the air in an unconfined substantially horizontal blast down along and parallel to said other side of said car and substantially above the passenger space.

3. The method of supplying air at a desired temperature into the passenger space of a railway passenger car, which comprises conditioning the air, projecting the air in an unconfined substantially horizontal blast down along and parallel to one longitudinal side of and returning the air in an unconfined substantially horizontal blast down along and parallel to the other longitudinal side of said car substantially above the passenger space, and directing air in substantially horizontal streams from one of said blasts to the other of said blasts at a plurality of longitudinally spaced points.

4. The method of supplying air at a desired temperature into the passenger space of a railway passenger car, which comprises conditioning the air at a plurality of points spaced along one longitudinal side of said car, and substantially above the passenger space, projecting the air at each of said points in an unconfined substantially horizontal blast to the other longitudinal side of said car, and passing the air in an unconfined substantially horizontal blast down along and parallel to said other longitudinal side of said car.

5. The method of supplying air at a desired temperature into the passenger space of a railway passenger car, which comprises projecting the air in an unconfined substantially horizontal blast down along and parallel to one longitudinal side of said car substantially above the passenger space, conditioning the air at a plurality of points in said blast, and deflecting the air at said points in substantially horizontal streams crosswise said car.

6. The method of supplying air at a desired temperature into the passenger space of a railway passenger car, which comprises projecting the air in an unconfined substantially horizontal blast down along and parallel to one longitudinal side of said car and substantially above the passenger space, returning the air in an unconfined substantially horizontal blast down along and parallel to the other longitudinal side of said car, substantially above the passenger space, conditioning the air in one of said blasts at a plurality of spaced points, and directing at each of said points, air into the other of said blasts in a substantially horizontal stream.

SAMUEL M. ANDERSON.